2 Sheets—Sheet 1.

G. W. WOODSIDE

Assignor, by mesne assignments, to P. H. WHITE, E. P. de NORMANDIE & G. M. WRIGHT

Chromatic Printing-Machine.

No. 8,939. Reissued Oct. 21, 1879.

Witnesses:

A. P. Grant,

W. F. Fischer

Inventor:

G. W. Woodside, by John A. Wiedersheim

ATTORNEY.

N. PETERS, PHOTO-LITHOGRAPHER, WASHINGTON, D. C.

2 Sheets—Sheet 2.

G. W. WOODSIDE.

Assignor, by mesne assignments, to P. H. WHITE, E. P. de NORMANDIE & G. M. WRIGHT.

Chromatic Printing-Machine.

No. 8,939. Reissued Oct. 21, 1879.

Witnesses:

*A. P. Grant,*

*W. H. Kercher*

Inventor:

*G. W. Woodside,*

*by John A. Wiedersheim,*

ATTORNEY.

N. PETERS, PHOTO-LITHOGRAPHER, WASHINGTON, D. C.

UNITED STATES PATENT OFFICE.

GEORGE W. WOODSIDE, OF PHILADELPHIA, PENNSYLVANIA, ASSIGNOR, BY MESNE ASSIGNMENTS, TO PETER H. WHITE, E. P. DE NORMANDIE, AND GEORGE M. WRIGHT.

IMPROVEMENT IN CHROMATIC-PRINTING MACHINES.

Specification forming part of Letters Patent No. 134,579, dated January 7, 1873; Reissue No. 8,939, dated October 21, 1879; application filed January 9, 1879.

*To all whom it may concern:*

Be it known that I, GEORGE W. WOODSIDE, of the city and county of Philadelphia, and State of Pennsylvania, have invented a new and useful Improvement in Chromatic-Printing Presses, which improvement is fully set forth in the following specification and accompanying drawings, in which—

Figure 1:
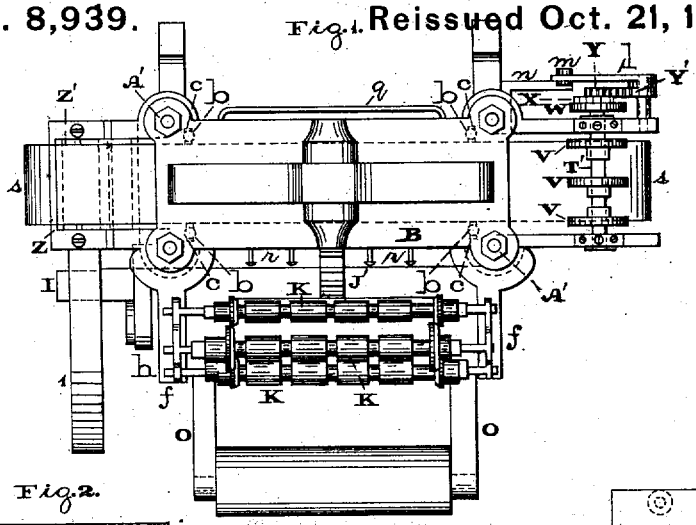
Figure 2:
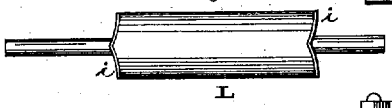
Figure 5:
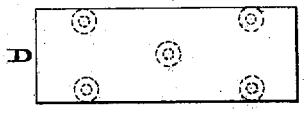
Figure 7:
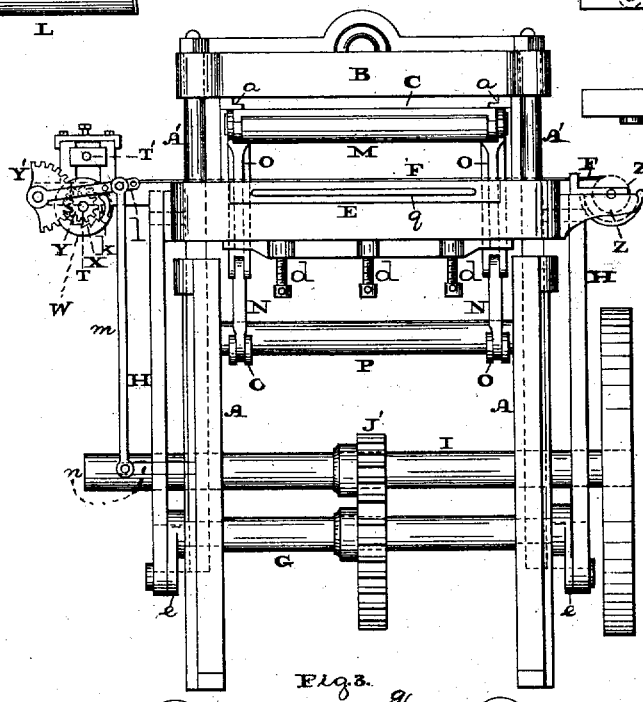
Figure 6:
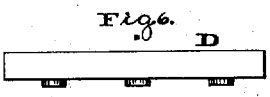
Figure 3:
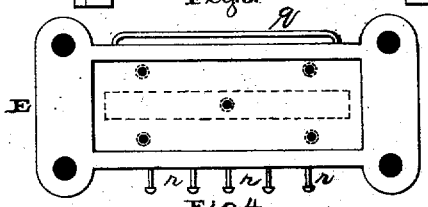
Figure 4:
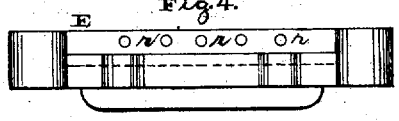
Figure 12:
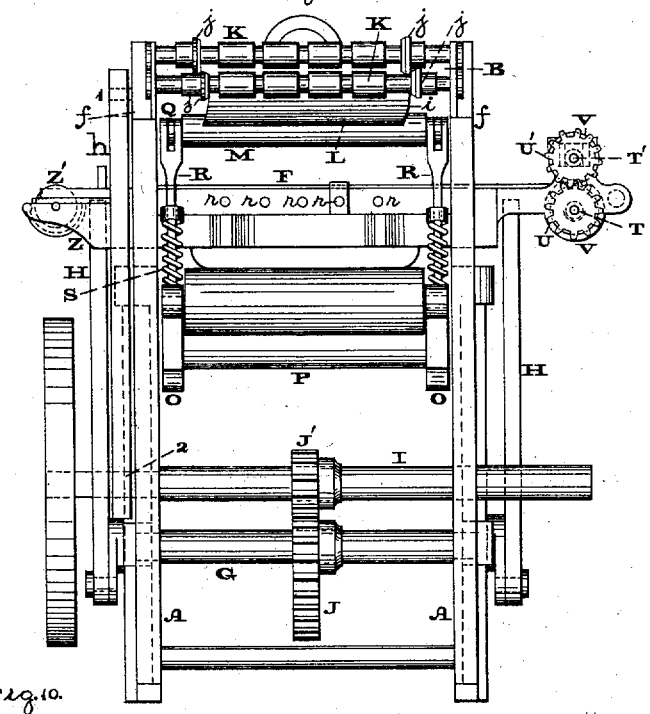
Figure 10:
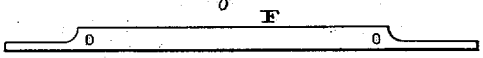
Figure 11:
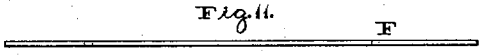
Figure 13:
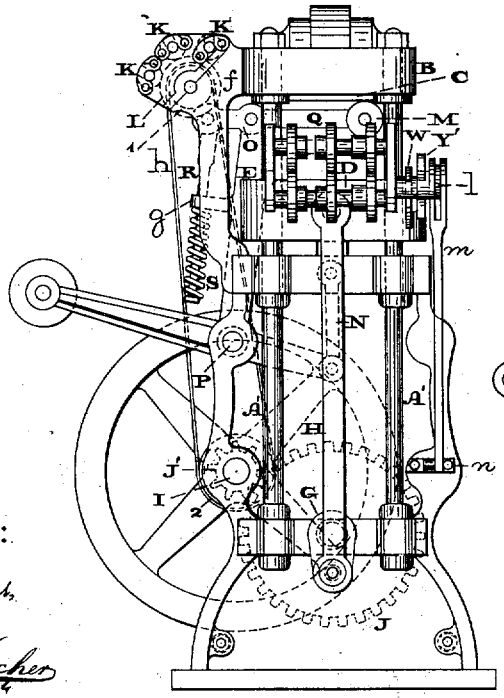
Figure 9:
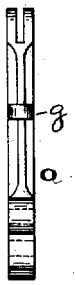
Figure 8:
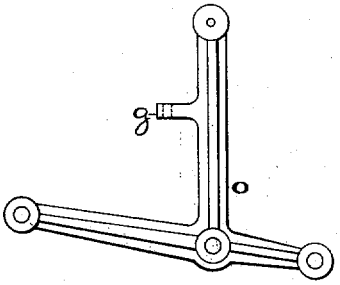

Figure 1 is a top or plan view of the press embodying my invention. Fig. 2 is a side elevation of the ink-distributing cylinders. Figs. 3 and 4 are plan and side views of the bed-plate. Figs. 5 and 6 are plan and side views of the platen. Fig. 7 is a front view of the press. Figs. 8 and 9 are side and edge views of one of the levers. Figs. 10 and 11 are side and edge views of one of the guide-strips. Fig. 12 is a rear view of the press. Fig. 13 is a side elevation thereof.

Similar letters of reference indicate corresponding parts in the several figures.

My invention consists, chiefly, in the combination of an inking-roller with a series of spaced distributing-rollers, moved upon an inking-cylinder in line of their axes by the proper mechanism, an inking-cylinder, and an intermittent feeding mechanism, the inking-roller operating at right angles to the line of feed.

It further consists in the combination of a vertically-operated bed-plate bearing a platen and guide-rods, the platen being capable of adjustment by means of screws under the bed-plate, and having the intermittent feed at the end of the bed-plate, with the inking-roller operated as above described.

Referring to the drawings, A represents the frame or housing of the press, and B represents the top plate, to the under side of which the form C is suspended, for which purpose rabbeted strips *a a* are employed.

D represents the platen or impression-plate, fitted in the movable bed-plate E, upon which platen the paper to be printed is laid and carried forward during the printing operation, guide-strips F being employed and rendered adjustable by means of slots *b* and screws *c* for different widths of paper. The bed-plate is provided with screws *d* for adjusting the height of the platen.

G represents a shaft, which is driven from the power-shaft I, and carries crank-arms *e e*, to which are connected rods H H, whose upper ends are properly secured to the bed-plate E, whereby vertical motions are imparted to said bed-plate.

Rods A′ A′ are connected at their lower ends to the frame A, and upper ends to the top plate, and they form guides for the bed-plate.

K K represent distributing-rollers, and L an inking-cylinder, which are mounted on supports *f*, secured to the frame A and top plate, B, and M represents an inking-roller, which is advanced and returned, in order to be brought into connection with the inking-cylinder L and the type form, by the vertical movements of the bed-plate E, through the medium of the connecting-rods N, horizontal levers Q, levers O, and rock-shaft P.

The inking-roller is held up against the form as it passes under the same by means of rods R and springs S, connected to the rear ends of the levers Q and arms *g g* of the levers O.

Should the springs break, the rods R prevent the rollers from falling until the pressman notices the break and new springs are supplied, said rods serving to support the springs at all times.

The inking-cylinder L is revolved by means of the belt *h*, which passes around a pulley, 1, on one end of the shaft of said cylinder, and a pulley, 2, on the driving-shaft.

The ends or heads of the cylinder are provided with cams, as at *i*, and they act against annular guides *j* on the distributing-rollers, whereby as said rollers rotate they receive sliding motions in the line of their axes, so as to cause a more perfect distribution of the ink.

The distributing-rollers K are divided into sections, whereby the different-colored inks are kept distinct and improper union of the inks is prevented.

If desired, the inking-roller may also be formed in sections similar to the rollers K. There will be as many sections in the rollers as are colors to be printed.

T T′ are shafts geared together by means of the wheels U U′, which are provided with feed-rollers V. The rollers are adjustable on their shafts for the purpose of being so arranged, when desired, as to feed a plurality of strips of paper at one operation.

An intermittent motion is given to the rollers, so as to keep the paper stationary when the impression is being given, and move it forward during the intervals by the vertical movements of the bed-plate E, there being fixed on one end of the lower feed-wheel shaft T a disk, W, provided with a spring-detent, *k*, which engages with the ratchet-wheel X, and prevents the latter turning on the shaft in the downward movement of the bed-plate.

Y is a pinion fixed to the ratchet-wheel, and in connection with the pinion there is a toothed segment, Y′, which turns partially on a permanent arm that projects from the bed-plate.

An arm, *l*, is connected to the segment and jointed to a vertical rod, *m*, whose lower end is jointed to the bracket *n* attached to the frame, so that as the bed-plate is descending the inner end of said arm is turned upward, giving a partial turn to the segment, which, by turning the pinion Y, gives motion to the feed-rollers to feed the paper forward in the downward movement of the bed-plate.

The spring-detent *k* does not operate in the upward movement of the bed-plate, and the pinion Y consequently turns loosely on the shaft T, thus preventing the movement of the rollers during the impression.

The arm *l* is provided with a series of openings for the adjustment of the vertical rod *m*, to vary the length of feed of the paper, as may be required.

It will be seen that the paper is fed through the feed-space between the form and platen, at a right angle to the line of motion of the inking-roller, whereby there is much less complication than would be by feeding in the line of the motion of the rollers, as in this case only one roller is required for spreading the ink on the form, while in the other arrangement one roller is required for each color.

Besides the advantage of decreasing the expense of building the machine, there is also a great saving of ink, by not having it to cover a great number of rollers, it being necessary to wash the rollers at intervals, in order to insure the execution of good work.

The length of feed of the paper is equal to each color on the form, so that an impression of all the colors is given in the passage over the platen.

As the paper is fed forward by an intermittent motion, it reaches the first division of the form, which, having received ink from the color on the first portion of the roller M, prints on the sheet the characters of said division of the form in the color of the first portion of the roller M, corresponding to the color on the first sections of the distributing-rollers K. The sheet then reaches the next form, and has printed on it the characters of said form in the color imparted to it from the next length or portion of the roller M, corresponding to the color of the second sections of the distributing-rollers K; and thus the work proceeds until finished, it being noticed that a single inking-roller imparts a distinct color to each division of the form, and the intermittent feeding motion presents the length of paper successively to said divisions, so that when the paper has passed over the several divisions, the complete characteristics are printed in different colors.

Tapes are connected at one end to the horizontal rod *q* at one edge of the bed-plate E, and at their other ends to pins *r*, at the other edge, to prevent the paper *s* being drawn up from the platen as the latter descends.

Pins *r* may be used instead of the rod *q*.

A gum trough, Z, is used in connection with the right-hand end of the bed-plate, in which is situated a roller, Z′, which gums or pastes the under side of the paper as it passes over it, the roller being turned by the forward movement of the paper.

I do not claim, broadly, the combination of the platen, inking-roller, and operating mechanism; but

What I claim is—

1. In a printing-press, the intermittent feeding mechanism, consisting of the geared shafts T T′, with feed-rollers V, the disk W, with spring-detent *k*, ratchet X, pinion Y, and toothed segment Y′, all moving with the bed-plate, and the arms *l m*, one of which is fixed to the segment Y′, and the other jointed to the frame of the press, all arranged and combined as shown, and for the purpose set forth.

2. The bed-plate E, having upon its upper surface the movable platen D and the adjustable guide-strips F, and under it the screws *d* to raise or lower the platen, the feeding mechanism at one end, and the gum roller and trough at the other, in combination with the inking-roller M, as shown and described.

3. The single inking-roller M, in combination with a series of spaced distributing-rollers, K, having the annular guides *j*, the inking-cylinder L, having the cams *i* and an intermittent feed mechanism, the said roller M being operated at a right angle to the line of feed, all constructed and operating as described, and for the purpose set forth.

4. The bed-plate E, having upon its upper surface the movable platen D and the guide-rods F, and under it the screws *d*, and the intermittent feed mechanism at one end, in combination with the inking-roller M, operated at right angles to the line of feed.

5. The combination of the rods N N, levers O O, connecting rock-shaft P, lever Q, springs S with the vertically-operated bed-plate E, the rods R, and lugs *q*, and inking-roller M, as and for the purpose set forth.

GEORGE W. WOODSIDE.

Witnesses:

JOHN A. WIEDERSHEIM,
H. E. GARSED.